US012380384B2

(12) United States Patent
Shao et al.

(10) Patent No.: US 12,380,384 B2
(45) Date of Patent: Aug. 5, 2025

(54) METHODS OF GREENING MANAGEMENT IN SMART CITIES, SYSTEM, AND STORAGE MEDIUMS THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yong Li, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 467 days.

(21) Appl. No.: 17/932,299

(22) Filed: Sep. 15, 2022

(65) Prior Publication Data

US 2023/0004903 A1 Jan. 5, 2023

(30) Foreign Application Priority Data

Aug. 30, 2022 (CN) .......................... 202211044663.4

(51) Int. Cl.
*G06Q 10/0631* (2023.01)
(52) U.S. Cl.
CPC .............................. *G06Q 10/06313* (2013.01)
(58) Field of Classification Search
CPC .......................... G06Q 10/06; G06Q 10/06313
See application file for complete search history.

(56) References Cited

U.S. PATENT DOCUMENTS 6,831,663 B2 * 12/2004 Chickering ............ G06Q 10/02
707/999.102
9,344,529 B2 * 5/2016 Killpack ............... H04L 67/125
(Continued)

OTHER PUBLICATIONS

Smartphone based precise monitoring method for farm operation. Caicong, Wu; Lin, Zhou; Jie, Wang; Yaping, Cai. International Journal of Agricultural and Biological Engineering. 9.3: 111-121. International Journal of Agricultural and Biological Engineering (IJABE). (May 2016).*

(Continued)

*Primary Examiner* — Timothy Padot
(74) *Attorney, Agent, or Firm* — Metis IP LLC

(57) ABSTRACT

The embodiments provide a method of greening management in smart cities, a system, and a storage medium thereof. The method is executed by a management platform, comprising: obtaining, based on an object platform, vegetation data of a monitoring region corresponding to the object platform through a sensor network platform, the vegetation data including at least one of species information, and actual growth parameters; obtaining vegetation anomaly information of the monitoring region based on the vegetation data, the vegetation anomaly information including a vegetation anomaly position and a vegetation anomaly amount; obtaining a predicted air quality of the monitoring region according to the vegetation anomaly information of the monitoring region in combination with a traffic flow and a population density of the monitoring region; and determining a greening processing priority of the monitoring region based on the predicted air quality and the vegetation anomaly information of the monitoring region.

11 Claims, 6 Drawing Sheets

(56) References Cited

U.S. PATENT DOCUMENTS

| | | | | |
|---|---|---|---|---|
| 10,597,895 B1* | 3/2020 | Daniels | | C12M 43/00 |
| 2009/0164054 A1* | 6/2009 | Peterson | | G06Q 10/06 |
| | | | | 701/2 |
| 2012/0191531 A1* | 7/2012 | You | | G06F 16/958 |
| | | | | 705/14.42 |
| 2016/0071410 A1* | 3/2016 | Rupp | | A01B 79/005 |
| | | | | 701/50 |
| 2016/0078375 A1* | 3/2016 | Ethington | | G06Q 10/06 |
| | | | | 705/7.27 |
| 2017/0300818 A1* | 10/2017 | Sinitsyn | | G06N 20/00 |
| 2019/0043201 A1* | 2/2019 | Strong | | G06V 10/96 |
| 2019/0259108 A1* | 8/2019 | Bongartz | | G06Q 10/0639 |
| 2020/0326195 A1* | 10/2020 | Gavranovic | | G08G 1/0129 |
| 2021/0151195 A1* | 5/2021 | Hayward | | G06F 3/04842 |

OTHER PUBLICATIONS

Applications of Information and Communication Technology for Improvements of Water and Soil Monitoring and Assessments in Agricultural Areas—A Case Study in the Taoyuan Irrigation District. Yu-Pin, Lin; Chang, Tsun-Kuo; Fan, Chihhao; Johnathen Anthony; Petway, Joy R; et al. Environments 4.1 MDPI AG. (Mar. 2017).*

Zhang, Mingyang, et al. "Urban anomaly analytics: Description, detection, and prediction." IEEE Transactions on Big Data 8.3 (2020): 809-826.*

G. Patrizi et al., "A Virtual Soil Moisture Sensor for Smart Farming Using Deep Learning," in IEEE Transactions on Instrumentation and Measurement, vol. 71, pp. 1-11, 2022.*

\* cited by examiner

300

---

Obtaining vegetation data of a monitoring region corresponding to an object platform based on the object platform through a sensor network platform, the vegetation data including at least one of species information, climate information, soil information, maintenance information, and the actual growth parameters — 310

Obtaining vegetation anomaly information of the monitoring region based on the vegetation data, the vegetation anomaly information including a vegetation anomaly position and a vegetation anomaly amount — 320

Obtaining a predicted air quality of the monitoring region according to the vegetation anomaly information of the monitoring region in combination with a traffic flow and a population density of the monitoring region — 330

Determining a greening processing priority of the monitoring region based on the predicted air quality and the vegetation anomaly information of the monitoring region — 340

410 — Constructing a vegetation feature vector based on the vegetation data of the monitoring region 420 — Retrieving a reference feature vector from a vegetation vector database based on the vegetation feature vector 430 — Determining reference growth parameters based on the reference feature vector 440 — Determining abnormal vegetation based on the actual growth parameters and the reference growth parameters 450 — Counting a vegetation anomaly amount of the monitoring region based on the abnormal vegetation

METHODS OF GREENING MANAGEMENT IN SMART CITIES, SYSTEM, AND STORAGE MEDIUMS THEREOF

CROSS-REFERENCE TO RELATED APPLICATIONS

This application claims priority to Chinese Patent Application No. 202211044663.4, filed on Aug. 30, 2022, the contents of which are hereby incorporated by reference.

TECHNICAL FIELD

The present disclosure generally relates to Internet of Things technology, in particular to methods of greening management in smart cities, systems, and storage mediums thereof.

BACKGROUND

The urban greening environment directly or indirectly affects the urban air quality, and the urban greening work involves many departments such as the Landscaping Department, the traffic management department, and the municipal road management department. At the same time, greening work may have certain impact on urban traffic and roads. Therefore, it is necessary to coordinate the work arrangement and progress of various departments to avoid improper greening work arrangement affecting the normal operation of urban traffic and road management. The Internet of Things technology can make use of Internet resources to realize the connection between people and things and between things, which achieves the purpose of informatization, remote management and control, and intelligence.

Therefore, it is necessary to provide a method for greening management in a smart city based on the Internet of Things.

SUMMARY

One or more embodiments of the present disclosure provide a method for greening management in a smart city, the method is executed by a management platform, comprising: obtaining, based on an object platform, vegetation data of a monitoring region corresponding to the object platform through a sensor network platform, the vegetation data including at least one of species information, climate information, soil information, maintenance information, and actual growth parameters; obtaining vegetation anomaly information of the monitoring region based on the vegetation data, the vegetation anomaly information including a vegetation anomaly position and a vegetation anomaly amount; obtaining a predicted air quality of the monitoring region according to the vegetation anomaly information of the monitoring region in combination with a traffic flow and a population density of the monitoring region; and determining a greening processing priority of the monitoring region based on the predicted air quality and the vegetation anomaly information of the monitoring region.

One or more embodiments of the present disclosure provide an Internet of Things system for greening management in a smart city, comprising an object platform, a sensor network platform, and a management platform. The management platform is configured to perform operations including: obtaining, based on the object platform, vegetation data of a monitoring region corresponding to the object platform through a sensor network platform, the vegetation data including at least one of species information, climate information, soil information, maintenance information, and actual growth parameters; obtaining vegetation anomaly information of the monitoring region based on the vegetation data, the vegetation anomaly information including a vegetation anomaly position and a vegetation anomaly amount; obtaining a predicted air quality of the monitoring region according to the vegetation anomaly information of the monitoring region in combination with a traffic flow and a population density of the monitoring region; and determining a greening processing priority of the monitoring region based on the predicted air quality and the vegetation anomaly information of the monitoring region.

One or more embodiments of the present disclosure provide a non-transitory computer-readable storage medium, the storage medium stores computer instructions, after the computer reads the computer instructions in the storage medium, the computer implements the method of greening management in a smart city.

BRIEF DESCRIPTION OF THE DRAWINGS

The accompanying drawings described herein is intended to provide a further understanding of some embodiments of the present disclosure, constitute a part of the present disclosure, and do not constitute a limitation of some embodiments of the present disclosure. In some embodiments, the same numbers denote the same structure, wherein:

FIG. 3 is an exemplary flowchart of a method for greening management in a smart city according to some embodiments of the present disclosure;

FIG. 4 is an exemplary flowchart of determining a vegetation anomaly amount according to some embodiments of the present disclosure;

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, parts or assemblies at different levels. However, if other words can achieve the same purpose, the words may be replaced by other expressions.

As shown in the description and the claims, unless the context expressly indicates exceptions, the words "one", and/or "this" do not specifically refer to the singular, but may also include the plural. Generally speaking, the terms "include" only indicate that the steps and elements that have been clearly identified are included, and these steps and elements do not constitute an exclusive list. Methods or equipment may also include other steps or elements.

Flowcharts are used in this disclosure to explain the operations performed by the system according to the embodiment of the present disclosure. It should be understood that the previous or subsequent operations are not necessarily performed accurately in order. Instead, the steps may be processed in reverse order or simultaneously. At the same time, other operations may be added to these processes, or one or more steps may be removed from these processes.

Figure 1:
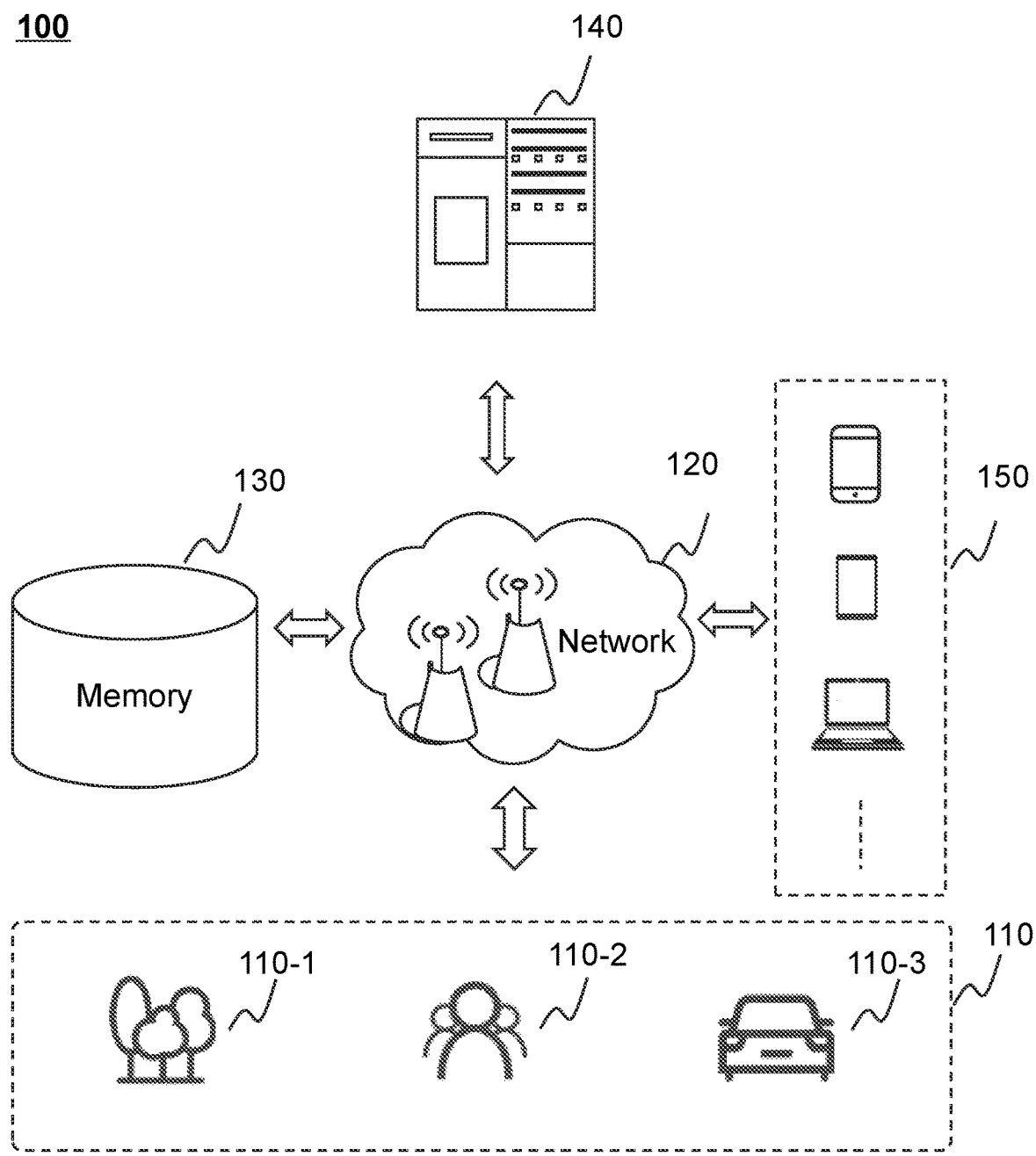
FIG. 1 is a schematic diagram of an application scenario of a system for greening management in a smart city according to some embodiments of the present disclosure.

FIG. 1 is a schematic diagram of an application scenario of a system for greening management in a smart city according to some embodiments of the present disclosure. As shown in FIG. 1, the application scenario 100 of the system for greening management in the smart city may include data information 110, a network 120, a memory 130, a processing device 140, and a terminal 150. In some embodiments, components in the application scenario 100 may connect and/or communicate with each other via a network 120 (e.g., a wireless connection, a wired connection, or a combination thereof). For example, the processing device 140 may be connected to the memory 130 through the network 120.

The data information 110 may be used to predict auxiliary information of a regional air quality. For example, the data information 110 may include basic vegetation information 110-1, population density information 110-2, traffic flow information 110-3, or the like.

In some embodiments, the basic vegetation information 110-1 may include one or more kinds of information such as vegetation type information, vegetation location information, climate information, soil information, maintenance information, heights of growing green plants, crown widths, etc. The basic vegetation information 110-1 may be obtained based on a variety of methods, such as user input, third-party platform acquisition, Unmanned Aerial Vehicle (UAV) acquisition, etc.

In some embodiments, the population density information 110-2 may be data related to a population number of a region. The population density information 110-2 may be obtained based on the urban heat map of the third-party platform.

In some embodiments, the traffic flow information 110-3 may be information related to traffic flow data of a region. The traffic flow information 110-3 may be obtained based on a third-party platform such as a traffic big data platform.

The memory 130 may be configured to store data, instructions, and/or any other information. In some embodiments, the memory 130 may be a part of the processing device 140.

The processing device 140 may process information and/or data related to the application scenario 100 of the system for greening management in the smart city to perform one or more functions described in the present disclosure. For example, the processing device 140 may determine the vegetation greening processing priority based on the vegetation basic information, a population density, and a traffic flow.

The terminal 150 may refer to one or more terminals or software used by the user. In some embodiments, a user (e.g., a municipal management department, a Landscaping Department, a traffic management department, etc.) may be an owner of the terminal 150. In some embodiments, the terminal 150 may be a device having a function of obtaining data. For example, the terminal 150 may be a device for an urban greening management personnel to obtain geographic location information of abnormal vegetation.

It should be noted that the application scenario 100 based on the system for green management in the smart city is provided for a purpose of illustration only and is not intended to limit the scope of the present disclosure. For those skilled in the art, various modifications or changes may be made according to the description of the present disclosure. However, changes and modifications do not depart from the scope of the present disclosure.

Figure 2:
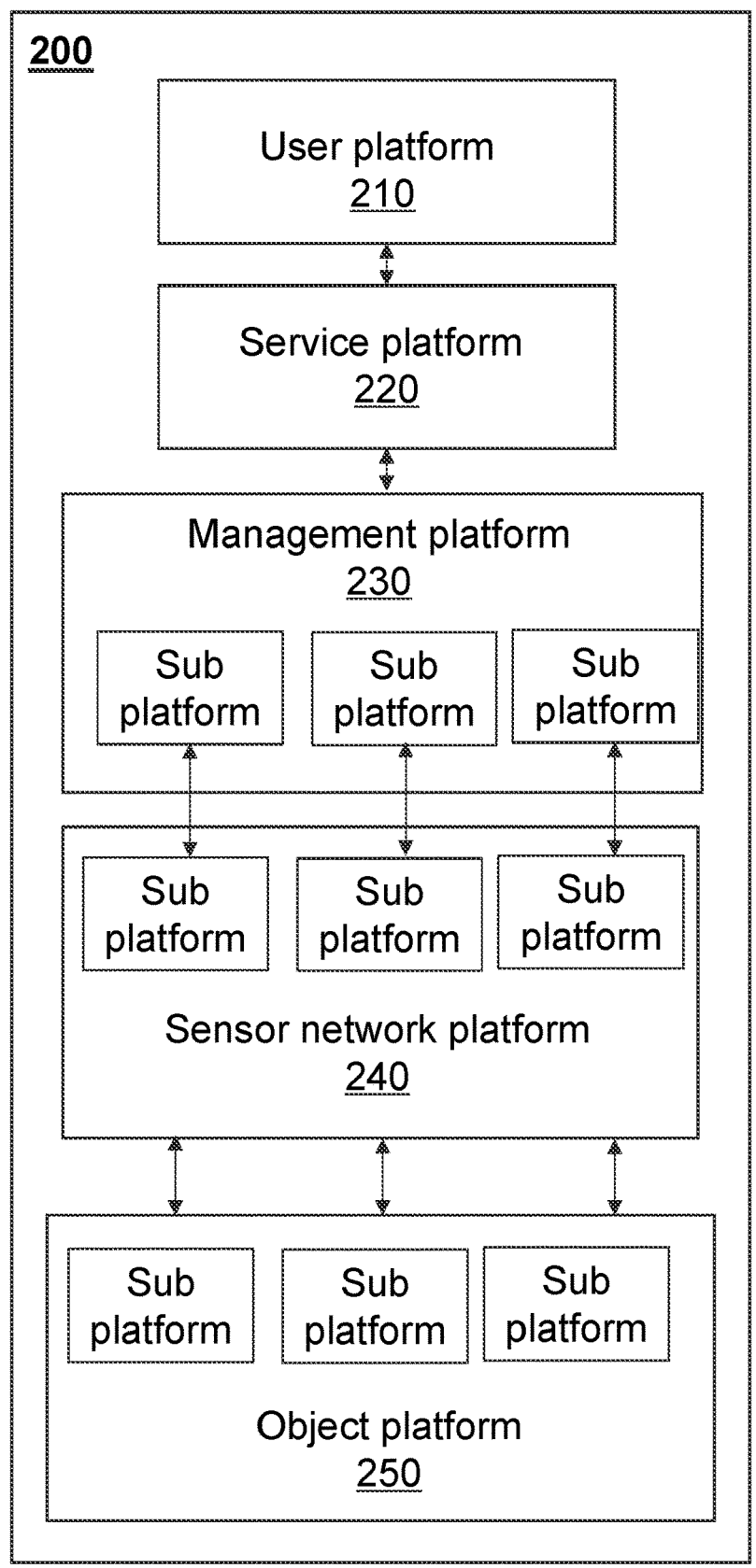
FIG. 2 is a module diagram of a system for greening management in a smart city according to some embodiments of the present disclosure.

FIG. 2 is a module diagram of a system for greening management in a smart city according to some embodiments of the present disclosure. In some embodiments, the system for greening management in the smart city 200 may include a user platform 210, a service platform 220, a management platform 230, a sensor network platform 240, and an object platform 250.

The user platform 210 may be a user-oriented service interface. In some embodiments, the user platform 210 may receive information from the user and/or the service platform. For example, the user platform 210 may receive the input from the user. For another example, the user platform 210 may receive information fed back to the user from the service platform, such as basic information of abnormal vegetation. In some embodiments, the user platform 210 may be configured to feedback information to the user. The user platform 210 may send information to the service platform.

The service platform 220 may be a platform for preliminary processing information. In some embodiments, the service platform 220 may transfer information obtained based on the user platform to the management platform. For example, vegetation information is transmitted to the management platform. In some embodiments, the service platform 220 may receive information sent by the management platform, for example, the vegetation basic information, the population density, a processing green vegetation priority, etc.

The management platform 230 may refer to an Internet of Things platform that plans and coordinates contact and cooperation among various function platforms and provides perceptual management and control management.

In some embodiments, the management platform 230 may determine vegetation anomaly information and a predicted air quality, and send the vegetation anomaly information and the predicted air quality to the service platform. In some embodiments, the management platform 230 may be configured as an independent structure. The independent structure refers to that the management platform includes a plurality of sub platforms of the management platform, each of the sub platform corresponds to different regions, which may store, process and/or transmit data of different regions uploaded by the sensor network platform based on a corresponding sub platform of the management platform.

In some embodiments, the management platform 230 may be further configured to obtain vegetation data of a corresponding monitoring region. The vegetation data may include at least one of species information, climate information, soil information, conservation information, and actual growth parameters.

In some embodiments, the management platform 230 may be further configured to obtain vegetation anomaly information of the monitoring region based on the vegetation data. The vegetation anomaly information may include a vegetation anomaly position and a vegetation anomaly amount.

In some embodiments, the management platform 230 may be further configured to obtain the predicted air quality of the monitoring region according to the vegetation anomaly information of the monitoring region and in combination with the traffic flow and the population density of the monitoring region. In some embodiments, the management platform 230 may be further configured to determine the greening processing priority of the monitoring region based on the predicted air quality and the vegetation anomaly information of the monitoring region. More descriptions may be found in FIG. 3 and its related descriptions.

The sensor network platform 240 may be a platform for realizing interaction between the management platform and the object platform. In some embodiments, the sensor network platform 240 may receive an instruction sent by the management platform for obtaining monitoring data of each region and send the instruction to an object platform, and the sensor network platform 240 may upload the monitoring data obtained by the object platform to the management platform.

In some embodiments, the sensor network platform 240 may be configured as an independent structure. The independent structure may refer to that the sensor network platform includes a plurality of sub platforms of the sensor network platform, each sub platform of the sensor network platform corresponds to a different region. A sub platform of the sensor network platform corresponding to a corresponding region may process the monitoring data uploaded by an object platform that collects monitoring data of the corresponding region, and upload corresponding monitoring data to a sub platform of the management platform corresponding to the region, and transmit a data obtaining instruction issued by a corresponding sub platform of the management platform to the object platform corresponding to the corresponding region.

The object platform 250 may be a function platform for generating perceptual information and finally executing control information. The object platform 250 may obtain monitoring data based on a monitoring device. For example, vegetation growth parameters may be obtained based on UAV sensors. In some embodiments, the object platform 250 may include sub platforms of the object platform corresponding to different regions, and each sub platform of the object platform may be implemented by a monitoring device or a sensing device. The sub platforms of the object platform corresponding to different regions may upload collected data to a corresponding sub platform of the sensor network platform respectively, and the corresponding sub platform of the sensor network platform may upload the data to a corresponding sub platform of the management platform for processing. Different sub platform of the management platform may send instructions for collecting corresponding data of the region to the sub platform of the object platform based on the corresponding sub platform of the sensor network platform, and the instructions may be executed by the corresponding sub platform of the object platform.

It should be noted that the above descriptions of the system for greening management in the smart city 200 is only for convenience of descriptions and not limit the description to the scope of the embodiments. It can be understood that, for those skilled in the art, after understanding the principle of the system, it is possible to arbitrarily combine various modules or form subsystems to connect with other modules without departing from this principle.

FIG. 3 is an exemplary flowchart of a method of greening management in a smart city according to some embodiments of the present disclosure. In some embodiments, the process 300 may be executed by a management platform. As shown in FIG. 3, the process 300 may include the following steps.

In 310, obtaining vegetation data of a monitoring region corresponding to an object platform based on the object platform through a sensor network platform, the vegetation data including at least one of species information, climate information, soil information, maintenance information, and the actual growth parameters.

The monitoring region may refer to a region where greening monitoring is required. A size of the monitoring region may be divided according to an actual situation. For example, the monitoring region may be a district or a street of a city.

The vegetation data may be data information related to vegetation. For example, the vegetation data may include at least one of species information, climate information, soil information, conservation information, and the actual growth parameters.

Vegetation data may be obtained by monitoring devices such as UAVs, or by third-party platforms.

A type information of the vegetation may be a plant community type to which the vegetation belongs. For example, ginkgo belongs to arbor. In some embodiments, the type information of the vegetation may be input in advance by the user.

The climate information may be data reflecting climate conditions of a current vegetation growth environment. For example, the climate information may be information such as a current weather temperature. In some embodiments, the climate information may be obtained through a third-party platform such as a meteorological platform.

The soil information may be information about soil where the current vegetation is located. For example, the soil information may be soil moistures, soil types, or the like. In some embodiments, the soil information may be obtained by a UAV or input by a user.

The maintenance information may be information recording data for maintaining vegetation. For example, the maintenance information may include irrigation and fertilization information, pruning and shaping information, pest control information, cold protection frequency information, or the like. In some embodiments, the maintenance information may be obtained based on greening work record data of the Landscaping Department.

The actual growth parameters may be data of the actual growth of vegetation. For example, the actual growth parameters may include data such as plant height and crown width. In some embodiments, the actual growth parameters may be captured by the UAV. For example, the actual growth parameters of the vegetation may be obtained based on an image analysis of a vegetation image taken by the UAV. When the UAV takes the vegetation image, it may take the image directly above the plant at a same flying height and a same shooting accuracy.

In 320, obtaining vegetation anomaly information of the monitoring region based on the vegetation data, the vegetation anomaly information including a vegetation anomaly position and a vegetation anomaly amount.

The vegetation anomaly information may be relevant data of vegetation that does not satisfy a growth standard. For example, the vegetation anomaly information may include position information and quantity information of vegetation that does not satisfy the growth standard, that is, the vegetation anomaly information may include the vegetation anomaly position and the vegetation anomaly amount.

The vegetation anomaly position may be a planting position of vegetation that does not satisfy the growth standard. The vegetation anomaly position may be expressed in various forms. For example, a street to which the vegetation belongs may be taken as the vegetation anomaly position, and longitude and latitude coordinates of the vegetation may be taken as the vegetation anomaly position.

The vegetation anomaly amount may be information related to an amount of vegetation in the monitoring region that does not satisfy the growth standard. The vegetation anomaly amount may be expressed in various forms, for example, it may be expressed by the amount of vegetation in the monitoring region that does not satisfy the growth standard, or it may be expressed by a proportion of the amount of vegetation in the monitoring region that does not satisfy the growth standard to a total amount of vegetation in the monitoring region. For example, there are 100 vegetation in the monitoring region, and the amount of vegetation that does not satisfy the growth standard is 20, so the vegetation anomaly amount is 20%.

In some embodiments, the management platform may obtain the vegetation anomaly information of the region based on the vegetation data in various ways, for example, the vegetation anomaly position may be determined based on the monitoring region corresponding to a device for obtaining the vegetation data. Based on an image recognition of the vegetation image corresponding to the monitoring region, the vegetation anomaly amount in the monitoring region may be counted.

In some embodiments, the vegetation anomaly information may be obtained in combination with the application of historical data. More description may be found in FIG. 4 and its related descriptions.

In 330, obtaining a predicted air quality of the monitoring region according to the vegetation anomaly information of the monitoring region in combination with a traffic flow and a population density of the monitoring region.

The traffic flow may be a count of vehicles passing through a certain point of highway in a certain time. For example, if the count of vehicles passing through a certain point of No. 1 highway in one hour is 50, the traffic flow of the highway is 50 vehicles/hour.

The population density may be a count of people per unit land area. For example, if there are 10000 people in 10 square kilometers of land, the population density of the region is 1000 people/square kilometer.

The predicted air quality may be predicted data related to an air condition, for example, a predicted air pollution degree. In some embodiments, the predicted air quality may be expressed as an air quality score, the greater the air quality score is, the worse the air quality is. For example, if a predicted air quality score is 40 points, the predicted air quality is grade 4.

In some embodiments, the predicted air quality in the monitoring region may be obtained according to the vegetation anomaly information in the monitoring region and in combination with the traffic flow and population density in the monitoring region. For example, the larger the vegetation anomaly amount is, the higher the traffic flow is, and the greater the population density is, the worse the predicted air quality may be.

In some embodiments, the predicted air quality under different conditions may be queried through a preset quality table. In the preset quality table, the air quality corresponding to different vegetation anomaly amounts, traffic flow, and population densities may be recorded based on historical experience. For example, when the vegetation anomaly amount is 10%, the traffic flow is 200 vehicles/hour, and the population density is 1000 people/square kilometer, it may be obtained that the predicted air quality is grade 3 by querying the table.

Figure 5:
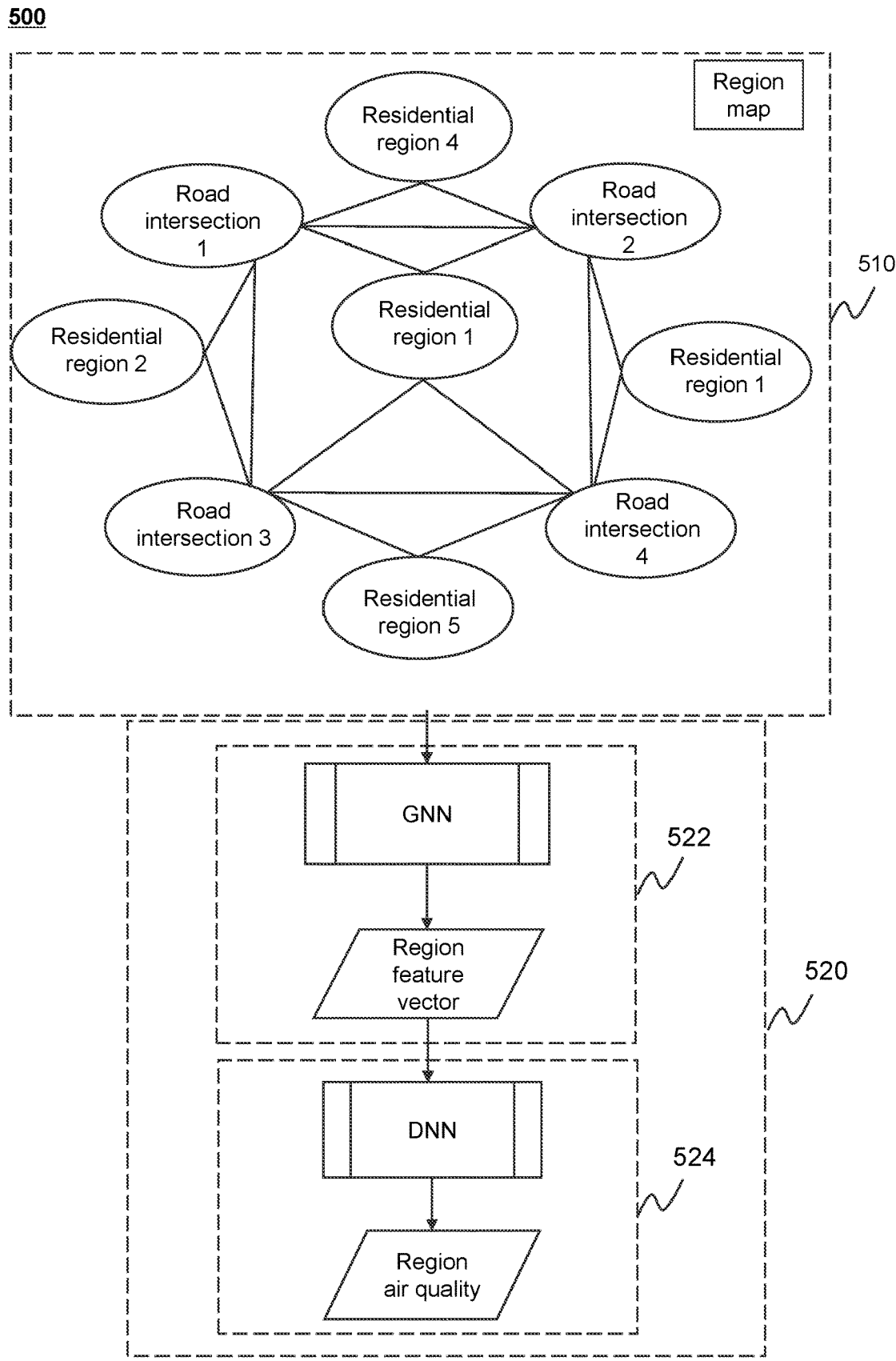
FIG. 5 is a schematic diagram of a process of predicting a regional air quality based on a prediction model according to some embodiments of the present disclosure.

In some embodiments, the predicted air quality may be determined based on a machine learning model, more descriptions may be found in FIG. 5 and its related descriptions.

In 340, determining a greening processing priority of the monitoring region based on the predicted air quality and the vegetation anomaly information of the monitoring region.

The greening processing priority may be a sequence of greening processing for vegetation anomaly. For example, the greening processing priority is higher, the greening processing may be required earlier. The greening processing may be an irrigation and fertilization of the vegetation in the monitoring region and processing of pests.

In some embodiments, the management platform may determine the greening processing priority of the monitoring region based on a variety of ways. For example, in the monitoring region where the traffic flow and population density are the same or the difference may be within a certain range, the greening processing priority with a poor air quality may be higher.

In some embodiments, the greening processing priority may be determined based on a weighted sum of the air quality score and the vegetation anomaly amount, and a weight may be set in advance. In some embodiments, the management platform may determine the greening processing priority of a region by referring to a preset comparison table of a relationship between the traffic flow, the population density, and the greening processing priority. In some embodiments, the greening processing priority may also be determined based on historical data. For example, the historical greening processing priority of a certain historical region where the historical predicted air quality and historical vegetation anomaly information is the same as the predicted air quality and vegetation anomaly information or a difference is within a preset range may be taken as the vegetation greening processing priority of a monitoring region.

Figure 6:
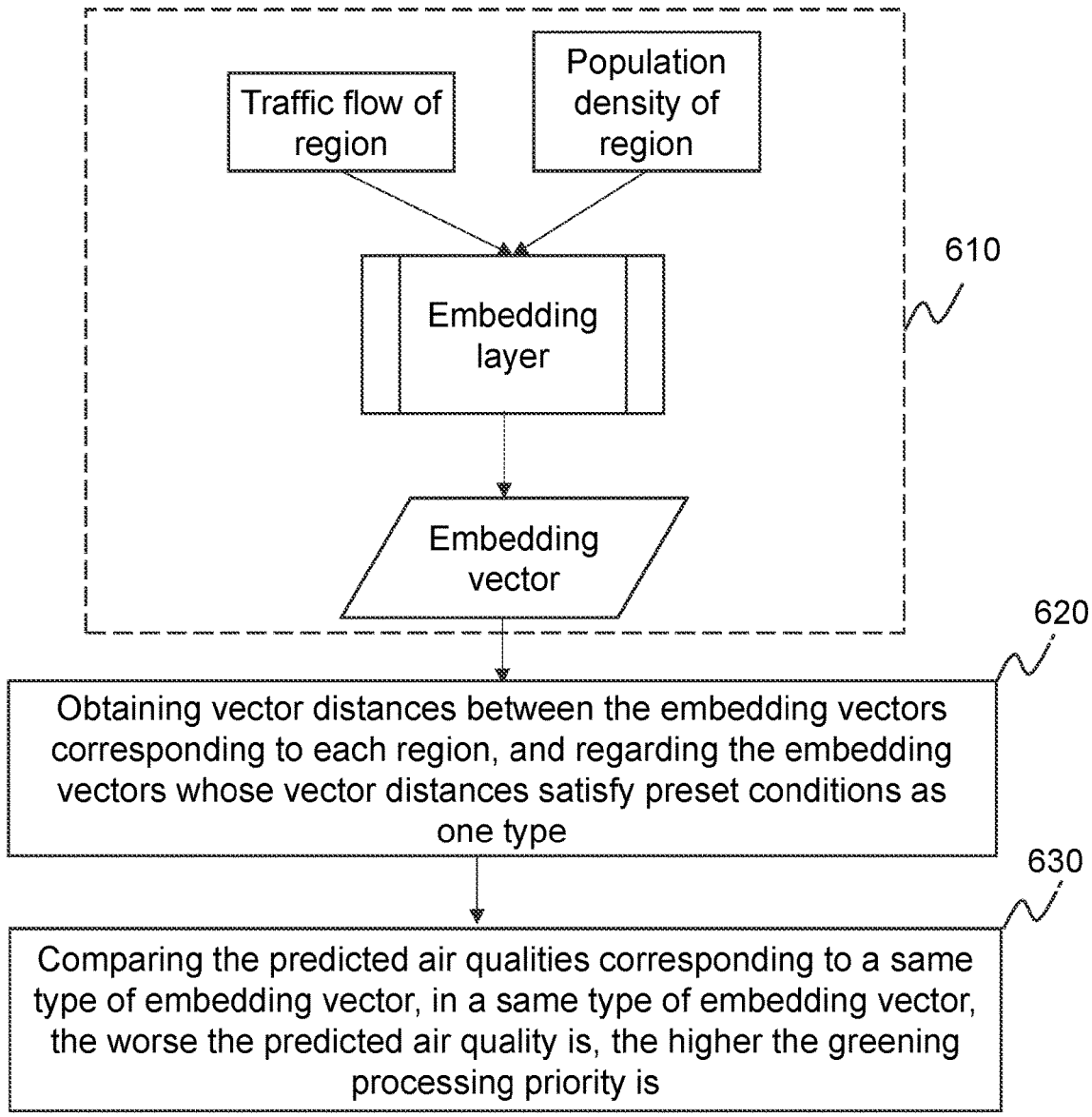
FIG. 6 is an exemplary flowchart of determining a vegetation exception processing priority according to some embodiments of the present disclosure.

For more details about determining the greening processing priority of the monitoring region, please see FIG. 6 and related descriptions.

In some embodiments of this present disclosure, basic information of vegetation and anomaly information of vegetation may be obtained by obtaining information such as vegetation image information, and the predicted air quality is obtained by combining the traffic flow, the population density, and the vegetation anomaly information, and then the vegetation greening processing priority in the monitoring region may be comprehensively determined. It can make the determination of the vegetation greening priority more reasonable, ensure timely greening processing of a corresponding monitoring region, and avoid interference caused by environmental deterioration, further beautify the urban environment.

FIG. 4 is an exemplary flowchart of determining a vegetation anomaly amount according to some embodiments of the present disclosure. In some embodiments, the process 400 may be executed by the processing device 140 or the management platform. As shown in FIG. 4, the process 400 may include the following steps.

In 410, constructing a vegetation feature vector based on the vegetation data of the monitoring region.

The vegetation feature vector may refer to a vector that may reflect vegetation types and vegetation growth environment information in the monitoring region. For example, the vegetation feature vector may reflect vegetation types, climate information, soil information, conservation information of a vegetation growth environment, etc.

In some embodiments, the management platform may construct a vegetation feature vector based on the vegetation data of the monitoring region, the vegetation data may include vegetation type information, the climate information of the monitoring region, the soil information of the monitoring region, and the vegetation maintenance information. In some embodiments, the management platform may assign values to different vegetation data, and construct a feature vector based on a corresponding assignment of the vegetation data. For example, the management platform may assign values of 1, 2, 3, 4, . . . , n to different vegetation types, assign values of 1, 2, 3, 4, . . . , m to different climate information, assign values of 1, 2, 3, 4, . . . , i to different soil information, assign values of 1, 2, 3, 4, . . . , j to different maintenance information, the constructed vegetation feature vector may be expressed as (n, m, i, j). For example, the vegetation feature vector (1, 1, 1, 1) may indicate that the vegetation type is 1, a climate type in the monitoring region is 1, the soil type in the monitoring region is 1, and a vegetation maintenance type is 1.

In 420, retrieving a reference feature vector from a vegetation vector database based on the vegetation feature vector.

In some embodiments, the vegetation feature vector may be constructed based on vegetation data of a plurality of vegetation to form a vector database. The vegetation vector database may refer to a vector set composed of a plurality of feature vectors, each feature vector may correspond to vegetation data of one plant. For more information about vegetation data, please refer to FIG. 3 and its descriptions.

In some embodiments, the vegetation data corresponding to the feature vectors in the vegetation vector database may be the vegetation data of the vegetation whose growth parameters satisfy the preset standards. Each feature vector may be stored in the database in association with vegetation growth parameters corresponding to the feature vector.

The reference feature vector may refer to a feature vector that satisfies a preset condition retrieved from the vegetation vector database, and the preset condition may be a preset similarity threshold. For example, the reference feature vector may include one or more feature vectors that satisfy the similarity threshold with the constructed vegetation feature vector, and one or more feature vectors are retrieved in the vegetation vector database.

In some embodiments, the management platform may retrieve in the vegetation vector database based on the vegetation feature vector, and determine the feature vector whose vector similarity with the vegetation feature vector is greater than or equal to the similarity threshold as the reference feature vector. The vector similarity may include a cosine similarity, or the like. The similarity threshold may be preset in advance. For example, the similarity threshold may be set as the cosine similarity of 0.95. In some embodiments, the management platform may retrieve one or more reference feature vectors from the vegetation vector database based on the vegetation feature vectors.

In 430, determining reference growth parameters based on the reference feature vector.

The reference growth parameters may refer to actual growth parameters of vegetation corresponding to the reference feature vector. For example, the reference growth parameters may be the actual plant heights, crown widths, etc. of an Osmanthus fragrans tree corresponding to the reference feature vector.

In some embodiments, the management platform may determine the reference growth parameters based on the reference feature vector, and the reference growth parameters may be stored in the vector database in association with the reference feature vector.

In some embodiments, when only one reference feature vector is retrieved, the management platform may directly determine growth parameters corresponding to the reference feature vector as the reference growth parameters. In some embodiments, when a plurality of reference feature vectors are retrieved, the management platform may average the plurality of reference growth parameters to obtain the average reference growth parameters as final reference growth parameters.

In 440, determining abnormal vegetation based on the actual growth parameters and the reference growth parameters.

The abnormal vegetation may refer to vegetation with abnormal growth parameters. For example, the abnormal vegetation may refer to vegetation with growth parameters such as plant heights and crown widths that does not satisfy a preset relationship with the reference growth parameters.

In some embodiments, the management platform may determine the abnormal vegetation based on the actual growth parameters and the reference growth parameters. For example, the management platform may determine vegetation as abnormal vegetation based on a fact that the actual growth parameters of the vegetation and the reference growth parameters do not satisfy the preset relationship. The preset relationship may refer to the preset relationship in advance between the actual growth parameters and the reference growth parameters. For example, the preset relationship may include that an actual plant height is not less than 90% of a reference plant height, and an actual crown width is not less than 90% of a reference crown width.

In some embodiments, the management platform may determine vegetation as the abnormal vegetation based on a fact that the actual growth parameters of the vegetation and the reference growth parameters do not satisfy any one of preset relationships. For example, when any one of a height or crown width of a certain Platycladus orientalis is less than a reference height or crown width, the Platycladus orientalis may be determined as an abnormal vegetation.

In 450, counting a vegetation anomaly amount of the monitoring region based on the abnormal vegetation.

In some embodiments, the management platform may count the vegetation anomaly amount in the monitoring region based on the abnormal vegetation. In some embodiments, the management platform may count the amount of abnormal vegetation in the monitoring region at an abnormal vegetation position based on the abnormal vegetation and the abnormal vegetation position, and determine the amount of abnormal vegetation in the monitoring region. For example, the amount of the vegetation anomaly in the monitoring region may be added to obtain a total amount of abnormal vegetation as the vegetation anomaly amount in the monitoring region. In some embodiments, the management platform may determine the abnormal vegetation type and a corresponding vegetation abnormal amount in the monitoring region based on abnormal vegetation type information and the abnormal vegetation position.

In some embodiments of the present disclosure, the reference growth parameters of vegetation may be determined by means of vector retrieval, and then the actual growth parameters may be compared with reference growth parameters to determine the abnormal vegetation. Influences of growth environments and maintenance conditions on the vegetation growth is considered, so that the results are more consistent with the actual situation and the statistical vegetation anomaly amount is more accurate.

It should be noted that the above descriptions of the process 400 is only for example and explanation, and does not limit the scope of application of the present disclosure. For those skilled in the art, various modifications and changes may be made to the process 400 under the guidance of the present disclosure. However, these amendments and changes are still within the scope of the present disclosure. For example, the process 400 may further include determining an anomaly processing method based on the vegetation anomaly amount.

FIG. 5 is a schematic diagram of a process 500 of predicting a regional air quality based on a prediction model according to some embodiments of the present disclosure.

In some embodiments, the predicted air quality may be obtained based on a prediction model, and the prediction model may be a machine learning model.

In some embodiments, inputs of the prediction model may be the vegetation data, the traffic flow, and the population density of the monitoring region, and an output of the prediction model may be the predicted air quality of the monitoring region.

In some embodiments, the prediction model may be trained by a plurality of labeled training samples. For example, a plurality of labeled training samples may be input into an initial prediction model, a loss function may be constructed from labels and results of the initial prediction model, and parameters of the initial prediction model may be iteratively updated by gradient descent or other methods based on the loss function. When preset conditions are satisfied, a model training may be completed, and the trained prediction model may be obtained. The preset conditions may be a convergence of the loss function, a count of iterations reaching the threshold, etc.

In some embodiments, the training samples may at least include a large amount of historical vegetation data, traffic flows, and population densities of monitoring regions and other regions. The label may be an actual air quality corresponding to each region, and may be manually marked or obtained based on network data.

In some embodiments, a prediction model structure may be a combined model of a graph neural network (GNN) and a deep neural network (DNN). The predicted air quality may be determined by operations including: constructing a region map based on the vegetation anomaly information of a region and in combination with the traffic flow and population density of the region; obtaining a region feature vector by processing the region map based on GNN, the region feature vector being output by nodes of the region map; and obtaining the predicted air quality by processing the region feature vector based on the DNN.

In some embodiments, the process 500 of predicting regional air quality may be performed by the management platform. As shown in FIG. 5, the process 500 may include following steps.

In 510, constructing a region map based on vegetation anomaly information in combination with a traffic flow and a population density of a region. Nodes of the region map may include residential nodes and road intersection nodes, and an edge of the region map may be used to connect two nodes with roads. Attributes of the residential nodes may include the population density and the vegetation anomaly amount. Attributes of the road intersection nodes may include the traffic flow. Attributes of the edge may include vegetation anomaly amount beside a road.

The region map may refer to a map structure that may reflect the vegetation anomaly information, the traffic flow, the population density, and its distribution in the monitoring region.

In some embodiments, the management platform may construct the region map based on the vegetation anomaly information of a region and in combination with the traffic flow and population density of the region. For example, the management platform may construct a region map based on the population density and vegetation anomaly information of each residential region in the region, the traffic flow of each road intersection in the region, and the vegetation anomaly information beside each road in the region.

The residential node may refer to a data point of a single residential region. For example, as shown in FIG. 5, the residential node may be "residential region 1".

In some embodiments, the attributes of the residential node may include a population density of a residential region and the vegetation anomaly amount of the residential region. For example, the attributes of the residential node may be "the population density is 300 people/square kilometer, and the vegetation anomaly amount accounts for 40%".

The road intersection node may refer to a data point of a single road intersection. For example, as shown in FIG. 5, the road intersection node may be "road intersection 1".

In some embodiments, the attributes of the road intersection node may include the traffic flow. For example, the attributes of the road intersection node may include "500 vehicles/hour".

The edge of the region map may be used to connect two nodes with roads. For example, as shown in FIG. 5, the edge of the region map may be an edge for connecting a road intersection node and a residential node, or an edge for connecting a road intersection node and another road intersection node. In some embodiments, the edges of the region map may be roads representing connecting nodes. For example, a road connecting two road intersection nodes.

In some embodiments, edge attributes of an edge of the region map may include the vegetation anomaly amount beside a road of the road corresponding to the edge. For example, the edge attributes of a certain edge in the region map may include "vegetation anomaly amount accounts for 30%".

In 520, obtaining the predicted air quality based on the prediction model.

In some embodiments, the prediction model may include an embedding layer and a prediction layer. In some embodiments, the embedding layer may be a graph neural network (GNN), and the prediction layer may be a deep neural network (DNN).

In some embodiments, the process 520 may be implemented by following steps 522 and 524.

In 522, obtaining a region feature vector through processing the region map based on GNN, and the region feature vector being output by nodes.

The region feature vector may refer to a vector corresponding to data that affects the air quality in the region map. For example, the region feature vector may be a vector reflecting the vegetation anomaly information, traffic flow, and population density of each node and the edge in the region map.

In some embodiments, the region map may be processed based on the GNN to obtain the region feature vector, the region feature vector may be output by the nodes of the region map. In some embodiments, an input of the GNN may be a region map, and an output of the GNN may be a region feature vector.

In 524, obtaining the predicted air quality by processing the region feature vector based on the DNN.

In some embodiments, an input of the DNN may be a region feature vector, such as the region feature vector output by GNN. An output of DNN may be a predicted region air quality corresponding to the region map. In some embodiments, the region air quality output by the DNN may be an air quality level. For example, level 1, level 2, level 3, etc., each level may represent different air quality conditions.

In some embodiments, parameters of GNN and DNN may be obtained through joint training. Training sample data (i.e., region maps of a plurality of regions) may be input to the GNN to obtain the region feature vector output by the GNN. Then, the region feature vector may be input into the DNN as the training sample data to obtain the predicted air quality output by the DNN, and an actual air quality of the sample may be used to verify the output of the DNN. Using a back propagation characteristic of the neural network model, verification data of the region feature vector output by the GNN may be obtained, and the verification data of the region feature vector may be used as a label to train the GNN.

By way of example only, an initial DNN and an initial GNN may be trained based on a large count of labeled training samples. Specifically, the region map of each region may be input to the initial GNN, and an output of the initial GNN may be taken as an input of the initial DNN. A loss function may be established based on the actual air quality of the sample and the output of the initial GNN to update parameters of the initial DNN and the initial GNN, and parameters of the DNN and the GNN may be iteratively updated at the same time based on the loss function until preset conditions are satisfied and a training may be completed. The preset conditions may include that the loss function is less than a threshold, the loss function converges, or a training period reaches the threshold.

Obtaining the parameters of GNN through the above training method is helpful to solve the problem that it is difficult to obtain labels when training the GNN alone in some cases, which can also enable the GNN to better obtain an embedding vector of the region map reflecting each region.

After the region feature vector is obtained by processing the region map, the air quality prediction may be carried out to optimize steps of data processing and improve an accuracy and efficiency of prediction.

Through a model prediction to obtain a region air quality, a self-learning ability of machine learning model may be used to find rules in a large amount of region data for predicting the region air quality in the future, improving the efficiency and accuracy of the prediction.

FIG. 6 is an exemplary flowchart of determining a vegetation exception processing priority according to some embodiments of the present disclosure.

In some embodiments, the worse the predicted air quality of the monitoring region is, the higher the greening processing priority is.

The greening processing priority may refer to a sequence of abnormal vegetation processing, and the greening processing priority may be negatively related to an air quality. The abnormal vegetation processing refers to replanting and strengthening maintenance of abnormal vegetation. By comparing the air quality status, the greening processing priority is determined, and the impact of air quality on people's life and health is considered, which is more in line with the actual needs.

In some embodiments, the predicted air quality may be expressed based on the air quality score, and the greening processing priority may be determined based on the weighted sum of the air quality score and the vegetation anomaly amount.

The air quality score may refer to a score that may measure the predicted air quality condition. In some embodiments, the better the predicted air quality condition is, the smaller the air quality score is. In some embodiments, the management platform may preset the air quality score for each level of predicted air quality. For example, when the air quality level is level 1, the preset air quality score is 10 points, when the air quality level is level 2, the preset air quality score is 20 points, and the air quality of level 1 is better than the air quality of level 2.

In some embodiments, a weight corresponding to the air quality score and the vegetation anomaly amount may be preset based on an actual situation. For example, the weight may be determined based on an impact degree of an air quality and vegetation anomaly on people's lives. The weight with a large impact degree may be relatively large, and the impact degree may be determined through investigation reports and other methods. A sum of the weights is 1.

In some embodiments, the management platform may perform weighted summation on the air quality score and the vegetation anomaly amount, and determine the greening processing priority based on a summation result. For example, the air quality score is n, and a corresponding weight is q1, the vegetation anomaly is m, and a corresponding weight is q2, then the weighted sum value may be n×q1+m×q2.

In some embodiments, the management platform may determine the greening processing priority based on a size of the weighted sum value, and the greening processing priority may be high if the weighted sum value is large. For example, if a weighted sum value of region A is greater than a weighted sum value of region B, the greening processing priority of the region A may be higher than that of the region B.

In some embodiments of the present disclosure, the greening processing priority may be determined based on a weighted sum value of the vegetation anomaly and the air quality score of a region, and the influence of the vegetation anomaly and the air quality on people's lives is considered, so that the determined greening processing priority is more reasonable.

In some embodiments, the management platform may first determine a region with the same traffic flow and population density, and then determine the greening processing priority based on the air quality of the region.

In some embodiments, the process 600 of determining the greening processing priority based on the air quality may be performed by the management platform. As shown in FIG. 6, the process 600 may include following processes.

In 610, embedding the traffic flow and the population density of a region based on the embedding layer to obtain an embedding vector, the embedding layer being obtained through a joint training with the prediction model.

The embedding vector may refer to a vector that may reflect the population density and traffic flow information in the monitoring region. For example, the embedding vector may reflect the population density of each residential region in the region A and the traffic flow information of the road intersection.

In some embodiments, the management platform may embed the traffic flow and the population density in the region based on the embedding layer to obtain the embedding vector.

In some embodiments, the embedding layer may be obtained through a joint training with the prediction model. For example, the embedding layer may be obtained through a joint training with the GNN in the prediction model.

As an example only, the management platform may take the region map constructed based on the vegetation data, traffic flow, and population density of a plurality of monitoring regions as training samples and input the training samples into the GNN of the prediction model to obtain a feature vector corresponding to each region map, take the feature vectors as labels of the training embedding layer, and take the traffic flows and the population densities of the plurality of monitoring regions as training samples to train the embedding layer.

In 620, obtaining vector distances between the embedding vectors corresponding to each region, and regarding the embedding vectors whose vector distances satisfy preset conditions as one type.

A vector distance may refer to a distance between each embedding vector. For example, a Euclidean distance, a Manhattan distance, etc.

The preset condition may refer to a relationship between a preset vector distance and a threshold value. For example, the preset condition may be that the vector distance does not exceed the vector distance threshold. In some embodiments, the vector distance threshold may be determined based on computational requirements. For example, it may be determined that the preset condition is that the Euclidean distance of a vector is less than or equal to 0.2.

In some embodiments, the management platform may regard the embedding vectors that satisfy the preset condition as one type based on the vector distance between the embedding vectors corresponding to each region. For example, if the vector distance between an embedding vector a and an embedding vector b is less than or equal to 0.2, the embedding vector a and the embedding vector b may be regarded as one type.

In 630, comparing the predicted air qualities corresponding to a same type of embedding vector, in a same type of embedding vector, the worse the predicted air quality is, the higher the greening processing priority is.

In some embodiments, the management platform may compare the predicted air qualities corresponding to the same type of embedding vector. In the same type of embedding vector, the worse the predicted air quality is, the higher the greening processing priority is. For example, in a same type of the embedding vector a and the embedding vector b, if the predicted air quality of the monitoring region corresponding to the embedding vector a is worse than the air quality of the monitoring region corresponding to the embedding vector b, the greening processing priority of the region corresponding to the embedding vector a may be higher than that of the region corresponding to the embedding vector b.

In some embodiments of the present disclosure, based on the region population density and traffic flow features, the greening processing priority may be determined after screening regions with the same population density and traffic flow features. Different greening processing priorities may be determined for the regions with the same traffic density and population density but different air qualities so as to give priority to the physical health of the resident and beautify the environment.

In some embodiments, when air qualities of the monitoring regions corresponding to the feature vectors of a same type are the same or satisfy a preset range, greening processing priority with a large vegetation anomaly amount in each monitoring region may be high.

The preset range may refer to a preset difference range of the air quality scores of predicted air qualities in different regions. For example, the preset range may be that differences of air quality scores do not exceed 5 points.

In some embodiments, if the predicted air quality corresponding to the same type of embedding vector is the same or satisfies the preset range, the greening processing priority of the region with large vegetation anomaly corresponding to the embedding vector may be higher than that of the region with small vegetation anomaly. For example, the air quality corresponding to the embedding vector a and the embedding vector b of the same type is the same, or the difference between the air quality scores is not more than 5 points, the vegetation anomaly amount of the region A corresponding to the embedding vector a accounts for 40%, and the vegetation anomaly amount of the region B corresponding to the embedding vector b accounts for 30%, then the greening processing priority of the region A may be higher than the greening processing priority of the region B.

In some embodiments of the present disclosure, the greening processing priority is determined by comparing the vegetation anomaly amount in regions with the same air quality. The urgency of greening processing under different conditions of air quality and vegetation anomaly amount is considered to make the determined priority more reasonable.

In some embodiments of the present disclosure, the greening processing priority is determined based on the air quality, considering the impact of air quality on people's life and health, which satisfies the actual needs.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A method for greening management in a smart city, wherein the method is executed by a processing device of a management platform, wherein the management platform includes a plurality of sub platforms of the management platform corresponding to different monitoring regions, the method comprising:

obtaining, based on an object platform, vegetation data of a monitoring region corresponding to the object platform through a sensor network platform, the vegetation data including at least one of species information, climate information, soil information, maintenance information, and actual growth parameters, wherein
the object platform at least includes a plurality of Unmanned Aerial Vehicles (UAV) in the different monitoring regions; and
the sensor network platform includes a network and a plurality of sub platforms of the sensor network platform corresponding to the different monitoring regions;

obtaining, by a corresponding sub platform of the management platform of the monitoring region, vegetation anomaly information of the monitoring region based on the vegetation data, the vegetation anomaly information including a vegetation anomaly position and a vegetation anomaly amount;

obtaining a population density of the monitoring region based on a urban heat map of a third-party platform;

obtaining a traffic flow of the monitoring region based on a traffic big data platform;

obtaining, by the corresponding sub platform of the management platform of the monitoring region, a predicted air quality of the monitoring region according to the vegetation anomaly information of the monitoring region in combination with the traffic flow and the population density of the monitoring region, including:
constructing a region map based on the vegetation anomaly information in combination with the traffic flow and the population density of the monitoring region, wherein
nodes of the region map include residential nodes and road intersection nodes,
an edge of the region map is used to connect two nodes with roads,
attributes of the residential nodes include the population density and the vegetation anomaly amount,
attributes of the road intersection nodes include the traffic flow, and
attributes of the edge include a vegetation anomaly amount beside a road;
obtaining, based on a prediction model, the predicted air quality according to the region map, wherein the prediction model includes a combined model of a graph neural network (GNN) and a deep neural network (DNN), wherein the obtaining the predicted air quality includes:
obtaining a region feature vector through processing the region map based on the GNN, the region feature vector being output by the nodes of the region map; and
obtaining the predicted air quality by processing the region feature vector based on the DNN;
wherein parameters of the GNN and the DNN are obtained through a joint training, the joint training including:
inputting a first training sample data to the GNN to obtain the region feature vector output by the GNN, wherein the first training sample data includes region maps of a plurality of regions;

inputting the region feature vector output by the GNN, as a second training sample data, into the DNN to obtain the predicted air quality output by the DNN;

using an actual air quality to verify the predicted air quality output by the DNN;

using a back propagation characteristic of the DNN to obtain verification data of the region feature vector output by the GNN;

using the verification data of the region feature vector as a label to train the GNN:

determining a greening processing priority of the monitoring region based on the predicted air quality and the vegetation anomaly information of the monitoring region;

sending the vegetation anomaly information and the greening processing priority of the monitoring region to a user platform based on a service platform, wherein the user platform includes a terminal, the terminal includes at least one of a municipal management department, a Landscaping Department, and a traffic management department; and the service platform includes a network; and controlling, based on the greening processing priority, the object platform to irrigate and fertilize vegetation in the monitoring region and to process pests.

2. The method of claim 1, wherein determining the vegetation anomaly amount in the monitoring region comprises:

constructing a vegetation feature vector based on the vegetation data of the monitoring region;

retrieving a reference feature vector from a vegetation vector database based on the vegetation feature vector;

determining reference growth parameters based on the reference feature vector;

determining abnormal vegetation based on the actual growth parameters and the reference growth parameters; and counting the vegetation anomaly amount of the monitoring region based on the abnormal vegetation.

3. The method of claim 1, wherein the greening processing priority is higher as the predicted air quality is worse.

4. The method of claim 3, wherein the predicted air quality is expressed based on an air quality score, and the greening processing priority is determined based on a weighted sum value of the air quality score and the vegetation anomaly amount.

5. The method of claim 1, further comprising:

embedding the traffic flow and the population density of the monitoring region based on an embedding layer to obtain an embedding vector, wherein the embedding layer is obtained through a joint training with the prediction model;

obtaining vector distances between the embedding vectors corresponding to each monitoring region, and regarding the embedding vectors whose vector distances satisfy preset conditions as one type; and comparing predicted air qualities corresponding to a same type of the embedding vector, wherein in the same type of embedding vector, the worse the predicted air quality is, the higher the greening processing priority is.

6. The method of claim 5, wherein when air qualities of the monitoring regions corresponding to the same type of the embedding vector are the same or satisfy a preset range, the greening processing priority with a large vegetation anomaly amount in each monitoring region is high.

7. An Internet of Things system for greening management in a smart city, comprising an object platform, a sensor network platform, and a management platform, wherein the object platform at least includes a plurality of Unmanned Aerial Vehicles (UAV) in different monitoring regions;

the sensor network platform includes a network and a plurality of sub platforms of the sensor network platform corresponding to the different monitoring regions; and the management platform includes a processing device and a plurality of sub platforms of the management platform corresponding to different monitoring regions; wherein the management platform is configured to perform operations including:

obtaining, based on the UAV of the object platform, vegetation data of a monitoring region corresponding to the object platform through the sensor network platform, the vegetation data including at least one of species information, climate information, soil information, maintenance information, and actual growth parameters;

obtaining, by a corresponding sub platform of the management platform of the monitoring region, vegetation anomaly information of the monitoring region based on the vegetation data, the vegetation anomaly information including a vegetation anomaly position and a vegetation anomaly amount;

obtaining a population density of the monitoring region based on a urban heat map of a third-party platform;

obtaining a traffic flow of the monitoring region, based on a traffic big data platform;

obtaining, by the corresponding sub platform of the management platform of the monitoring region, a predicted air quality of the monitoring region according to the vegetation anomaly information of the monitoring region in combination with the traffic flow and the population density of the monitoring region, including:

constructing a region map based on the vegetation anomaly information in combination with the traffic flow and the population density of the monitoring region, wherein nodes of the region map include residential nodes and road intersection nodes, an edge of the region map is used to connect two nodes with roads, attributes of the residential nodes include the population density and the vegetation anomaly amount, attributes of the road intersection nodes include the traffic flow, and attributes of the edge include a vegetation anomaly amount beside a road;

obtaining, based on a prediction model, the predicted air quality according to the region map, wherein the prediction model includes a combined model of a graph neural network (GNN) and a deep neural network (DNN), wherein the obtaining the predicted air quality includes:

obtaining a region feature vector through processing the region map based on the GNN, the region feature vector being output by the nodes of the region map; and obtaining the predicted air quality by processing the region feature vector based on the DNN;

wherein parameters of the GNN and the DNN are obtained through a joint training, the joint training including;
inputting a first training sample data to the GNN to obtain the region feature vector output by the GNN, wherein the first training sample data includes region maps of a plurality of regions;
inputting the region feature vector output by the GNN, as a second training sample data, into the DNN to obtain the predicted air quality output by the DNN;
using an actual air quality to verify the predicted air quality output by the DNN;
using a back propagation characteristic of the DNN to obtain verification data of the region feature vector output by the GNN;
using the verification data of the region feature vector as a label to train the GNN;
determining a greening processing priority of the monitoring region based on the predicted air quality and the vegetation anomaly information of the monitoring region;
sending the vegetation anomaly information and the greening processing priority of the monitoring region to a user platform based on a service platform, wherein the user platform includes a terminal,
the terminal includes at least one of a municipal management department, a Landscaping Department or a traffic management department; and
the service platform includes a network; and
controlling, based on the greening processing priority, the object platform to irrigate and fertilize vegetation in the monitoring region and to process pests.

8. The system of claim 7, wherein the management platform is further configured to:
construct a vegetation feature vector based on the vegetation data of the monitoring region;
retrieve a reference feature vector from a vegetation vector database based on the vegetation feature vector;
determine reference growth parameters based on the reference feature vector;
determine abnormal vegetation based on the actual growth parameters and the reference growth parameters; and
count the vegetation anomaly amount of the monitoring region based on the abnormal vegetation.

9. The system of claim 7, wherein the greening processing priority is higher as the predicted air quality is worse.

10. The system of claim 9, wherein the predicted air quality is expressed based on an air quality score, and the greening processing priority is determined based on a weighted sum value of the air quality score and the vegetation anomaly amount.

11. A non-transitory computer-readable storage medium, wherein the storage medium stores computer instructions, after the computer reads the computer instructions in the storage medium, the computer implements a method of greening management in a smart city, the method comprising:
obtaining, based on an object platform, vegetation data of a monitoring region corresponding to the object platform through a sensor network platform, the vegetation data including at least one of species information, climate information, soil information, maintenance information, and actual growth parameters, wherein the object platform at least includes a plurality of Unmanned Aerial Vehicles (UAV) in different monitoring regions; and
the sensor network platform includes a network and a plurality of sub platforms of the sensor network platform corresponding to the different monitoring regions;
obtaining, by a corresponding sub platform of a management platform of the monitoring region, vegetation anomaly information of the monitoring region based on the vegetation data, the vegetation anomaly information including a vegetation anomaly position and a vegetation anomaly amount;
obtaining a population density of the monitoring region based on a urban heat map of a third-party platform;
obtaining a traffic flow of the monitoring region based on a traffic big data platform;
obtaining, by the corresponding sub platform of the management platform of the monitoring region, a predicted air quality of the monitoring region according to the vegetation anomaly information of the monitoring region in combination with the traffic flow and the population density of the monitoring region, including:
constructing a region map based on the vegetation anomaly information in combination with the traffic flow and the population density of the monitoring region, wherein
nodes of the region map include residential nodes and road intersection nodes,
an edge of the region map is used to connect two nodes with roads,
attributes of the residential nodes include the population density and the vegetation anomaly amount,
attributes of the road intersection nodes include the traffic flow, and
attributes of the edge include a vegetation anomaly amount beside a road;
obtaining, based on a prediction model, the predicted air quality according to the region map, wherein the prediction model includes a combined model of a graph neural network (GNN) and a deep neural network (DNN), wherein the obtaining the predicted air quality includes:
obtaining a region feature vector through processing the region map based on the GNN, the region feature vector being output by the nodes of the region map; and
obtaining the predicted air quality by processing the region feature vector based on the DNN;
wherein parameters of the GNN and the DNN are obtained through a joint training, the joint training including:
inputting a first training sample data to the GNN to obtain the region feature vector output by the GNN, wherein the first training sample data includes region maps of a plurality of regions;
inputting the region feature vector output by the GNN, as a second training sample data, into the DNN to obtain the predicted air quality output by the DNN;
using an actual air quality to verify the predicted air quality output by the DNN;
using a back propagation characteristic of the DNN to obtain verification data of the region feature vector output by the GNN;
using the verification data of the region feature vector as a label to train the GNN;

determining a greening processing priority of the monitoring region based on the predicted air quality and the vegetation anomaly information of the monitoring region;

sending the vegetation anomaly information and the greening processing priority of the monitoring region to a user platform based on a service platform, wherein the user platform includes a terminal,
- the terminal includes at least one of a municipal management department, a Landscaping Department, and a traffic management department; and
- the service platform includes a network; and controlling, based on the greening processing priority, the object platform to irrigate and fertilize vegetation in the monitoring region and to process pests.

* * * * *